United States Patent [19]
Murata et al.

[11] Patent Number: 5,621,866
[45] Date of Patent: Apr. 15, 1997

[54] IMAGE PROCESSING APPARATUS HAVING IMPROVED FRAME BUFFER WITH Z BUFFER AND SAM PORT

[75] Inventors: Masahiro Murata; Takahiro Sakuraba, both of Kawasaki, Japan

[73] Assignee: Fujitsu Limited, Kawasaki, Japan

[21] Appl. No.: 94,880

[22] Filed: Jul. 22, 1993

[30] Foreign Application Priority Data

Jul. 24, 1992 [JP] Japan ................................. 4-197338
Oct. 16, 1992 [JP] Japan ................................. 4-278666

[51] Int. Cl.$^6$ ................................. G06T 15/40
[52] U.S. Cl. ................................. 395/122; 345/139
[58] Field of Search ................................. 395/119, 122, 395/127, 162; 365/221, 230.01; 345/149, 190, 196, 200, 113, 139

[56] References Cited

U.S. PATENT DOCUMENTS

| | | | |
|---|---|---|---|
| 4,347,587 | 8/1982 | Rao ................................. | 365/230.09 |
| 4,725,831 | 2/1988 | Coleman ................................. | 395/141 |
| 4,882,683 | 11/1989 | Rupp et al. ................................. | 345/193 |
| 4,951,229 | 8/1990 | DiNicola et al. ................................. | 395/152 |
| 4,951,232 | 8/1990 | Hannah ................................. | 395/122 |

(List continued on next page.)

FOREIGN PATENT DOCUMENTS

| | | |
|---|---|---|
| 0360903A1 | 4/1990 | European Pat. Off. . |
| 0467394A2 | 1/1992 | European Pat. Off. . |

OTHER PUBLICATIONS

Foley et al, Computer Graphics; Principles & Practice, 1990, pp. 649, 668–673, 856–861, 886–893.
Hardware Display Windowing System, IBM Technical Disclosure Bulletin, vol. 28 No. 12 May 1986 pp. 5209–5210.
Color Display Window Control, IBM Technical Disclosure Bulletin, vol. 29 No. 6, Nov. 1986, pp. 2526–2527.
Foley et al., Computer Graphics: Principles and Practice, 1990, pp. 894–919.

(List continued on next page.)

*Primary Examiner*—Heather R. Herndon
*Assistant Examiner*—Anton W. Fetting
*Attorney, Agent, or Firm*—Armstrong, Westerman, Hattori, McLeland & Naughton

[57] ABSTRACT

An image processing apparatus for use in three-dimensional graphics has a frame buffer in a single device with a SAM port for simultaneously storing image information and depth information per pixel. For high speed pattern filling, the frame buffer has an image buffer for storing image information of a predetermined number of horizontal pixels in response to individual write permit signals for each pixel and a Z buffer for simultaneously outputting stored depth information and storing new depth information in response to write permit signals. A circuit identifying whether an image to be plotted is a horizontal line causes the predetermined number of pixels write permit signal output circuits to simultaneously calculate new depth information, compare the depth information read from the Z buffer with the calculated depth information and simultaneously output the write permit signals relative to the image buffer and Z buffer based on the comparison.

11 Claims, 11 Drawing Sheets

OTHER PUBLICATIONS

| | | | |
|---|---|---|---|
| 4,970,499 | 11/1990 | Ryherd et al. | 395/122 |
| 5,001,470 | 3/1991 | Bandai | 395/122 |
| 5,029,105 | 7/1991 | Coleman et al. | 345/153 |
| 5,043,714 | 8/1991 | Perlman | 345/196 |
| 5,043,921 | 8/1991 | Gonzalez-Lopez et al. | 395/122 |
| 5,063,533 | 11/1991 | Erhart et al. | 395/425 |
| 5,065,369 | 11/1991 | Toda | 365/230.5 |
| 5,121,360 | 6/1992 | West et al. | 365/730.03 |
| 5,159,663 | 10/1992 | Wake | 395/122 |
| 5,170,468 | 12/1992 | Shah et al. | 345/186 |
| 5,179,372 | 1/1993 | West et al. | 345/189 |
| 5,271,094 | 12/1993 | Albaugh et al. | 395/122 |
| 5,274,760 | 12/1993 | Schneider | 395/162 |
| 5,301,263 | 4/1994 | Dowdell | 395/122 |
| 5,319,603 | 6/1994 | Watanabe et al. | 365/230.5 |
| 5,339,394 | 8/1994 | Johnson, Jr. et al. | 395/325 |
| 5,420,972 | 5/1995 | Johnson, Jr. et al. | 395/143 |

OTHER PUBLICATIONS

Wirth, Algorithms + Data Structures = Programs, 1976, pp. 10–21.

Fuchs, Pixel–Planes 5, Computer Graphics, Jul. 1989, pp. 79–88.

Potmesil, The Pixel Machine, Computer Graphics, Jul. 1989, pp. 69–78.

United Kingdom Search Report.

United Kingdom Search Report w/cover letter.

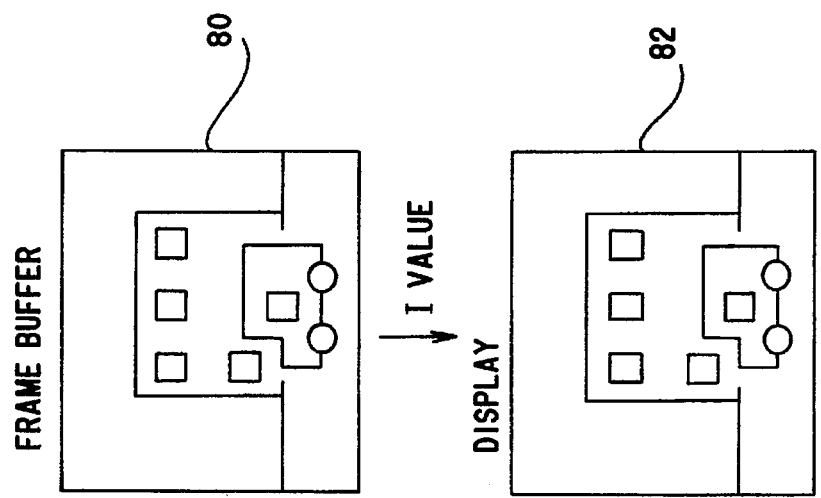
FIG. 6
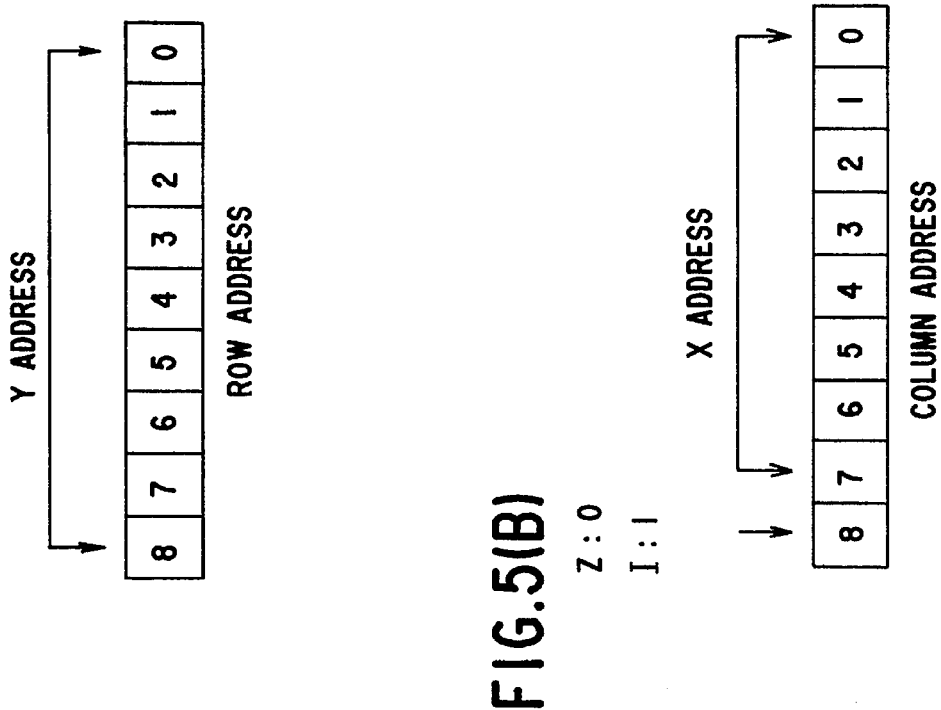
FIG. 5(A)
FIG. 5(B)

| TWO LOW-ORDER BITS OF X | | CALCULATING CIRCUIT | | | |
|---|---|---|---|---|---|
| | | A0 | A1 | A2 | A3 |
| X=0 | CALCULATE EN | Zs + 0<br>1 | Zs + Zi<br>1 | Zs + 2Zi<br>1 | Zs + 3Zi<br>1 |
| X=1 | CALCULATE EN | Zs - Zi<br>0 | Zs + 0<br>1 | Zs + Zi<br>1 | Zs + 2Zi<br>1 |
| X=2 | CALCULATE EN | Zs - 2Zi<br>0 | Zs - Zi<br>0 | Zs + 0<br>1 | Zs + Zi<br>1 |
| X=3 | CALCULATE EN | Zs - 3Zi<br>0 | Zs - 2Zi<br>0 | Zs - Zi<br>0 | Zs + 0<br>1 |

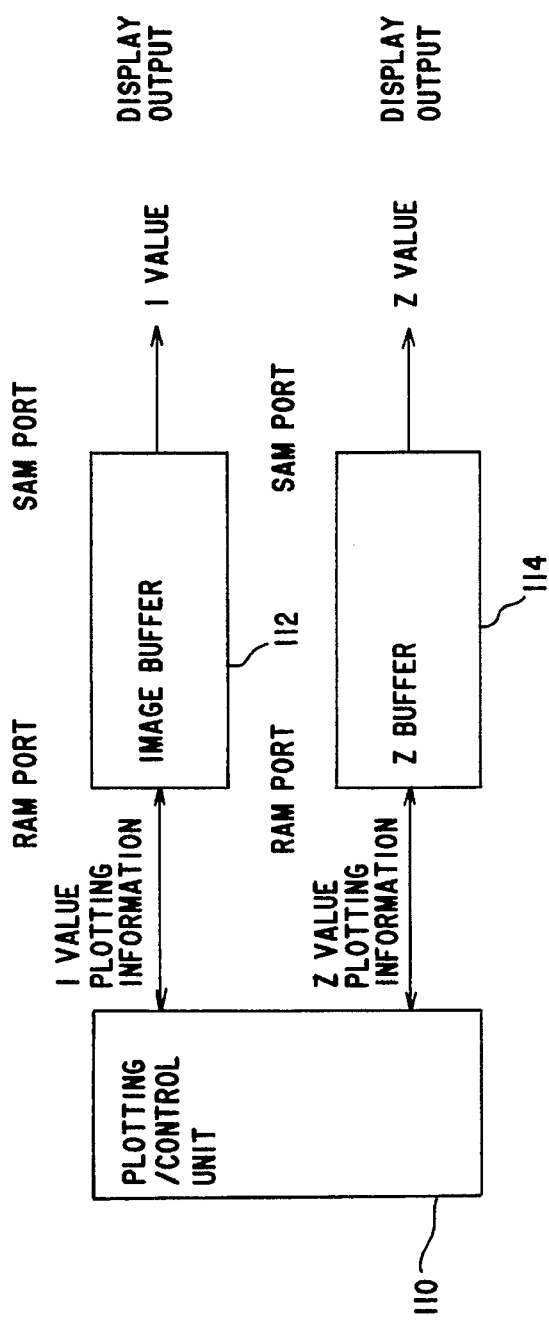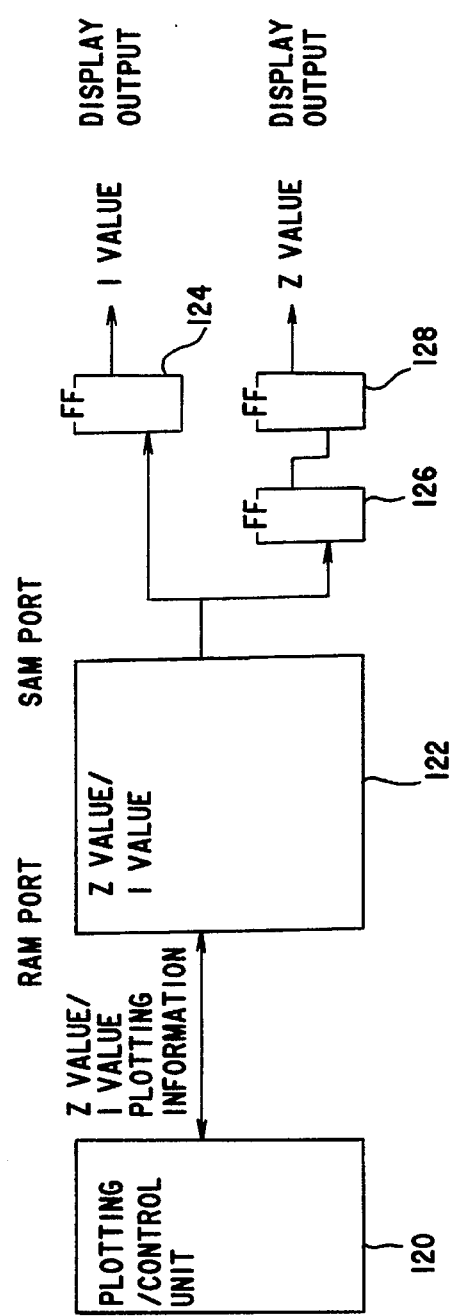

FIG.13

| SAM PORT | Z0 | I0 | Z1 | I1 | Z2 | I2 | Z3 | I3 |
|---|---|---|---|---|---|---|---|---|

| FF FOR Z VALUE (FIRST) | Z0 | Z1 | Z2 | Z3 |
|---|---|---|---|---|

| FF FOR Z VALUE (SECOND) | Z0 | Z1 | Z2 | Z3 |
|---|---|---|---|---|

| FF FOR I VALUE | I0 | I1 | I2 | I3 |
|---|---|---|---|---|

IMAGE PROCESSING APPARATUS HAVING IMPROVED FRAME BUFFER WITH Z BUFFER AND SAM PORT

BACKGROUND OF THE INVENTION (1) Field of the Invention

The present invention relates to an image processing apparatus for use in three-dimensional graphics, the image processing apparatus having a frame buffer for storing image information and depth information per pixel, and more particularly to an image processing apparatus having a frame buffer for storing depth information to compare the depths of a plurality of figures for pattern filling or Z merging.

(2) Description of the Related Art

When a plurality of three-dimensional figures are simultaneously displayed on an image display device, a front figure and a back figure are superposed if all the image information of the figures is displayed. It is therefore necessary to employ a means for determining to which figure image information to be outputted to the image display device belongs pixel by pixel.

Three-dimensional image display systems display information which is composed of image information (I value) and depth information (Z direction information: Z value) that are assigned to each pixel. When the information is to be displayed, the Z values of the pixels are compared, and the image information of the pixels are compared, and the image information of those pixels which are in the topmost position or front layer is written in an image buffer of a frame buffer.

FIG. I(A) of the accompanying drawings is a conceptual representation of a conventional three-dimensional image display system. The three-dimensional image display system shown in FIG. I(A) comprises a Z buffer 1, an image buffer 4, a CRT (Cathode-Ray Tube) 5, a processor 6, and a main memory 7. The Z buffer 1 and the image buffer 4 are jointly referred to as a frame buffer. The Z buffer 1 includes a Z buffer control circuit 2 and a Z buffer memory 3.

The processor 6 generates and stores plotting data in the main memory 7. The plotting data are composed as a cluster of line segments (straight lines) of three-dimensional data, and converted into two-dimensional projected data, which are written in the image buffer 4 and displayed on the CRT 5.

In plotting data in three-dimensional graphics, a Z buffer data concealing process is generally used in order to produce a two-dimensional projected image.

More specifically, the image buffer 4 stores I values, i.e., the image information of a figure, of respective pixels, and the Z buffer 1 stores Z values, i.e., the depth information of the figure, corresponding to the respective I values stored in the image buffer 4. The Z buffer control circuit 2 for controlling the Z buffer 1 compares the depth information (Z value) of a certain pixel with the Z value of a pixel that has originally been plotted in the position (as expressed by X and Y coordinates) of that pixel, and leaves the I and Z values of the pixel which is less deep, i.e., whose Z value is smaller, in the image buffer 4 and the Z buffer, respectively. Therefore, when a three-dimensional object is plotted as a two-dimensional image, it is possible to display a naturally represented image whose deeper portions concealed by surfaces and ridges that are in the front position.

FIG. 2(A) of the accompanying drawings illustrates a process of calculating the Z value of each pixel for plotting a desired straight line in the three-dimensional image display system. In the process shown in FIG. 2(A), X and Y coordinates and corresponding Z values of pixels which make up a straight line extending from a starting point having coordinates (Xs, Ys) to an ending point having coordinates (Xe, Ye).

The Z buffer control circuit 2 is given an initial value Zs of the Z value at the starting-point coordinates (Xs, Ys) and an increment Zi of the Z value between two adjacent pixels. Based on the given values, the Z buffer control circuit 2 calculates the Z values of the respective pixels making up the straight line, from starting-point coordinates (Xs, Ys) to the ending-point coordinates (Xe, Ye).

In addition, the Z buffer control circuit 2 compares each of the calculated Z values with the Z value of a pixel of an image that has originally been present at the corresponding X and Y coordinates. If the calculated Z value is smaller than the Z value of the pixel that has originally been present, then the Z buffer control circuit 2 writes the calculated Z value into the Z buffer memory 3, and allows the I value of the corresponding pixel to be written into the image buffer 4, i.e., writes a newly plotted pixel into the image buffer 4. If the calculated Z value is greater than the Z value of the pixel that has originally been present, then the Z buffer control circuit 2 does not update the Z buffer memory 3 and the image buffer 4, and hence keeps the information relative to the originally present pixels in the buffer memory 3 and the image buffer 4.

FIG. 1(B) of the accompanying drawings shows the Z buffer control circuit 2 in detail. The Z buffer control circuit 2 includes a Zs register 25, a Zi register 26, a Y address register 28, and an X address register 29. These registers store the initial value Zs, the increment Zi, the starting-point coordinates (Xs, Ys), and the ending-point coordinates (Xe, Ye) which are given from the processor 6. The Z buffer control circuit 2 also has an adder 22 for successively calculating the Z values of the respective pixels from starting-point coordinates (Xs, Ys) to the ending-point coordinates (Xe, Ye) based on the initial value Zs and the increment Zi, and successively outputting the calculated Z values to an output register 23. The output register 23 successively transmits the calculated Z values Zw to the Z buffer memory 3 through a signal line 20, and also to a comparator 24.

The comparator 24 successively compares the calculated Z values Zw from the output register 23 with Z values Zr of originally present pixels read from the Z buffer memory 3. If a calculated Z value Zw is smaller than a Z value Zr, then the comparator 24 supplies a write permit signal to the Z buffer memory 3 and the image buffer 4 through a signal line The Z buffer memory 3 and the image buffer 4 write therein a calculated Z value Zw and a corresponding I value at the time a write permit signal is supplied thereto. The addresses where these values are written in the Z buffer memory 3 and the image buffer 4 are determined on the basis of the starting-point coordinates (Xs, Ys) to the ending-point coordinates (Xe, Ye) that are stored in the X and Y address registers 29, 28.

Heretofore, the Z buffer data concealing process is carried out with respect to each of the pixels that make up the straight line.

The coordinates of the pixels making up the straight line are calculated by DDA (Digital Differential Analyzer) or the like, which will however not be described below as it has no direct bearing on the present invention. The calculation of the I values of the pixels to be written in the image buffer 4 will no be described below either.

Pattern filling is frequently used in plotting an object as a solid model in three-dimensional graphics. In pattern filling, a surface is processed as a cluster of many horizontal lines as shown in FIG. 2(B) of the accompanying drawings. Since the above calculation of a Z value per pixel greatly affects the processing time, it has been an obstacle to demands for high-speed image plotting.

The image buffer 4 of the frame buffer generally comprises a dual-port D-RAM (Dynamic Random-Access Memory) called a video RAM. The video RAM has a plotting RAM port and a display SAM (Serial-Access Memory) port, and writes and holds the I value of one frame through the RAM port, and successively outputs the I values of one scanning line through the SAM port.

The Z buffer 1 of the frame buffer is not required to have an SAM port as the Z values are used in plotting an image but not in displaying an image. Therefore, the conventional Z buffer may comprise a dual-port D-RAM with its SAM port made unusable or an inexpensive single-port D-RAM.

FIG. 3 of the accompanying drawings shows a conventional frame buffer having an image buffer and a Z buffer which comprise D-RAMs, respectively. In FIG. 3, each of an image buffer 52 and a Z buffer 54 has a RAM port for communication with a plotting/controlling unit 50. The image buffer 52 has a SAM port for outputting display data to an image display device (not shown). The Z buffer 54 has no such SAM port.

According to another conventional design, a frame buffer is not composed of two D-RAMs, but comprises a single video RAM for storing both Z and I values. The video RAM has an area for storing the Z values and an area for storing the I values, the areas being separately controlled. When an image is to be displayed, the video RAM outputs only the I values from a SAM port.

FIG. 4 of the accompanying drawings shows a conventional frame buffer which comprises a single video RAM chip. In FIG. 4, both Z and I values are written in a frame buffer 62 that comprises a single video RAM chip. The frame buffer 62 has a RAM port connected to a plotting/controlling unit 60 for inputting and outputting both the Z and I values, and a SAM port for outputting only the I values, but not the Z values.

Addresses of separate areas for storing Z and I values are illustrated in FIGS. 5(A) and 5(B) of the accompanying drawings. As shown in FIG. 5(A), all bits of a row address are used to indicate an address in a Y direction. As shown in FIG. 5(B), the most significant bit of a column address is used as a bit to differentiate the area for storing the Z values from the area for storing the I values, and the low-order 8 bits of the column address are used to indicate an address in an X direction.

There has recently been proposed a three-dimensional image display system with a Z merging function for displaying a figure with a small depth, i.e., with small Z values, based on a plurality of three-dimensional graphic data after they have been plotted. According to the proposed three-dimensional image display system, the display data of three-dimensional figures that are plotted separately in a plurality of frame buffers are concealed in a Z merging unit, and thereafter a composite image thereof is displayed on an image display device. In order to realize this system, it is necessary to output both the Z and I values from each of the frame buffers.

FIG. 6 of the accompanying drawings shows a display mechanism of a three-dimensional image display system with no Z merging function. With no Z merging function, figures from a plurality of frame buffers cannot be concealed, and an image is displayed on a display unit 82 based on I values outputted from a single frame buffer 80.

FIG. 7 of the accompanying drawings shows a display mechanism of a three-dimensional image display system with a Z merging function. In FIG. 7, a Z merging unit 94 effects a concealing action on Z and I values outputted from a frame buffer A 90 and Z and I values outputted from a frame buffer B 92, and outputs generated I values to a display unit 96.

The Z merging function allows a figure to be plotted by the plural frame buffers, resulting in high-speed graphic display operation. However, the frame buffers each capable of outputting both Z and values are required to perform the Z merging function.

SUMMARY OF THE INVENTION

It is a first object of the present invention to provide an image processing apparatus for calculating Z values at high speed when plotting a horizontal line to achieve high-speed plotting operation.

A second object of the present invention is to provide an image processing apparatus having frame buffers each capable of outputting both Z and I values for plotting and displaying an image at high speed employing a Z merging function.

To accomplish the first object of the present invention, there is provided an image processing apparatus comprising a frame buffer for storing image information and depth information per pixel, the frame buffer comprising an image buffer for simultaneously storing image information of a predetermined number of pixels arranged in a horizontal direction in response to write permit signals individually given to the pixels, respectively, and a Z buffer for simultaneously outputting stored depth information with respect to the pixels and simultaneously storing new depth information with respect to the pixels in response to the write permit signals, identifying means for identifying whether a condition indicating that an image to be plotted is a horizontal line is satisfied or not, and a plurality of as many write permit signal output means as the predetermined number, for simultaneously calculating respective items of new depth information with respect to the pixels when the condition is satisfied as identified by the identifying means, comparing the depth information read from the Z buffer with the calculated depth information, and simultaneously outputting the write permit signals with respect to the respective pixels to the image buffer and the Z buffer based on the result of comparison.

To achieve the second object of the present invention, there is also provided an image processing apparatus comprising a frame buffer for storing image information and depth information per pixel, the frame buffer comprising, an image buffer for storing the image information per pixel and outputting the stored image information, and a Z buffer for storing the depth information per pixel and outputting the stored depth information.

According to the present invention, there is also provided an image processing apparatus comprising a frame buffer for storing image information and depth information per pixel, the frame buffer comprising a single video RAM chip having a SAM port, writing means for writing the image information and the depth information in the frame buffer according to a row address and a column address which represents identifying information indicative of the image information or the depth information, reading means for distinguishing and alternately reading the image information and the depth information from the SAM port of the frame buffer based on the column address, and serial-to-parallel converting means for simultaneously outputting the image information and the depth information per pixel which are alternately read out of the SAM port.

The above and other objects, features, and advantages of the present invention will become apparent from the following description when taken in conjunction with the

BRIEF DESCRIPTION OF THE DRAWINGS

FIG. 5(A) is a diagram showing a row address for writing Z and I values in a single video RAM chip;

FIG. 5(B) is a diagram showing a column address for writing Z and I values in a single video RAM chip;

FIG. 6 is a diagram showing a display mechanism of a three-dimensional image display system with no Z merging function;

FIG. 11 is a block diagram of an image processing apparatus according to a second embodiment of the present invention;

FIG. 12 is a block diagram of an image processing apparatus according to a third embodiment of the present invention;

FIG. 13 is a timing chart illustrative of an operation sequence of the image processing apparatus shown in FIG. 12;

DESCRIPTION OF THE PREFERRED EMBODIMENTS

Figure 1A:
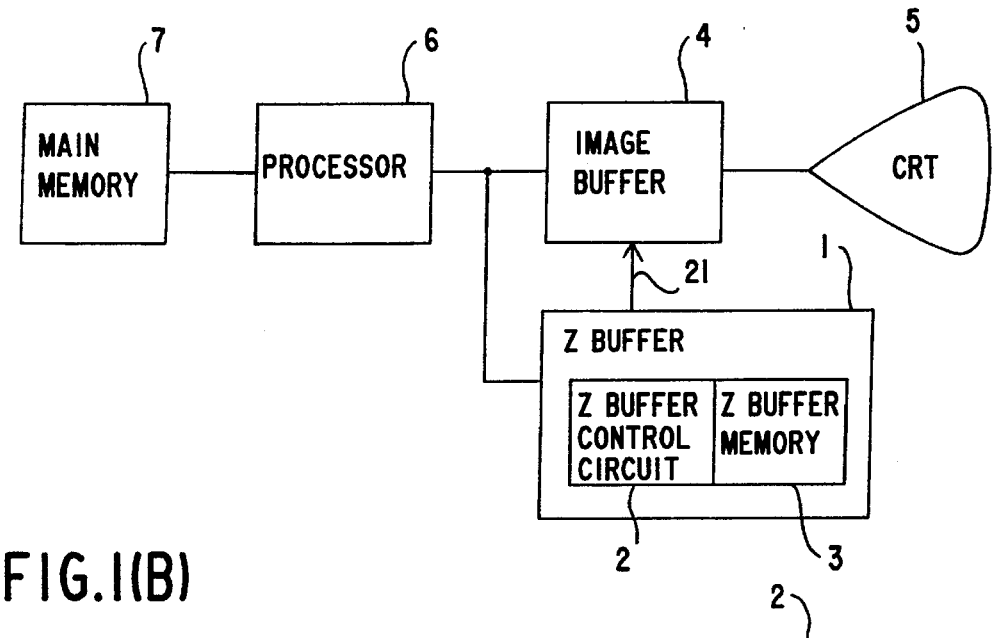
FIG. 1(A) is a block diagram of a conventional three-dimensional image display system.
Figure 1B:
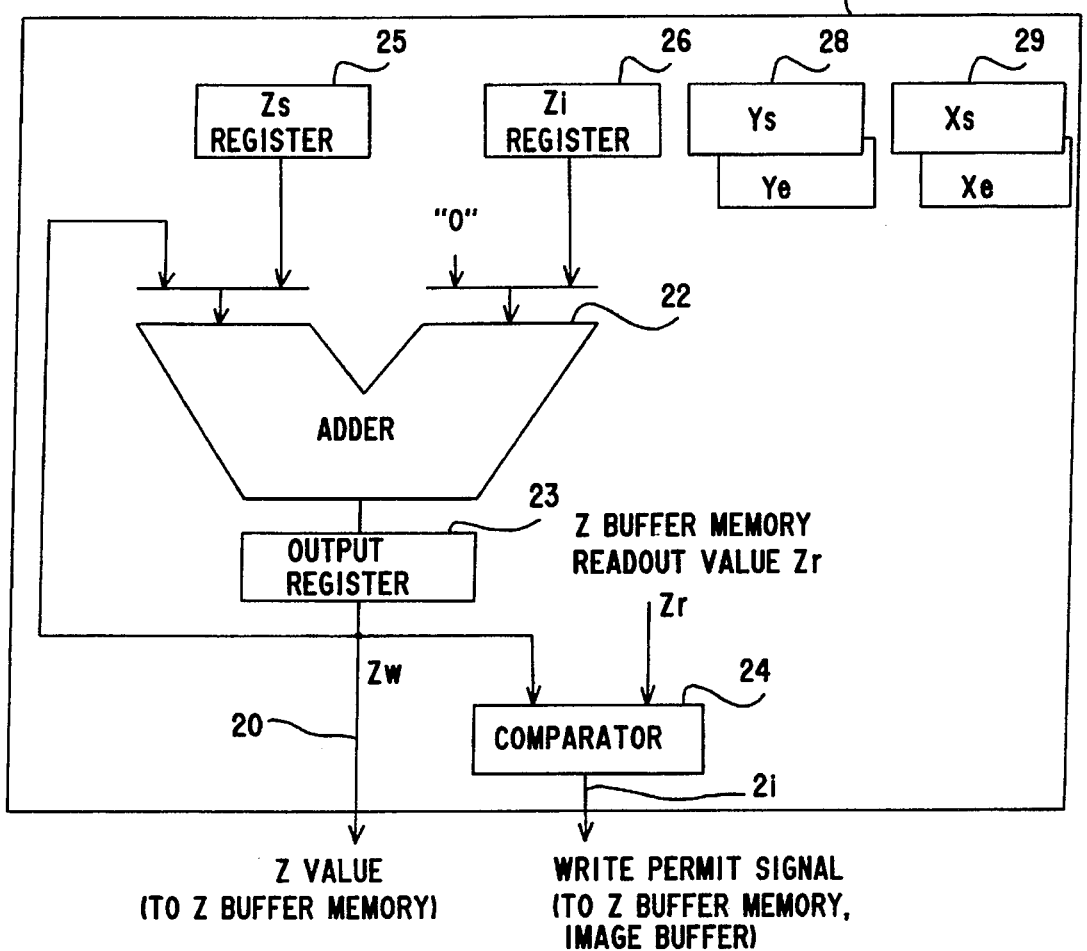
FIG. 1(B) is a block diagram of a buffer control circuit in the three-dimensional image display system shown in FIG. 1(A)
Figure 2A:
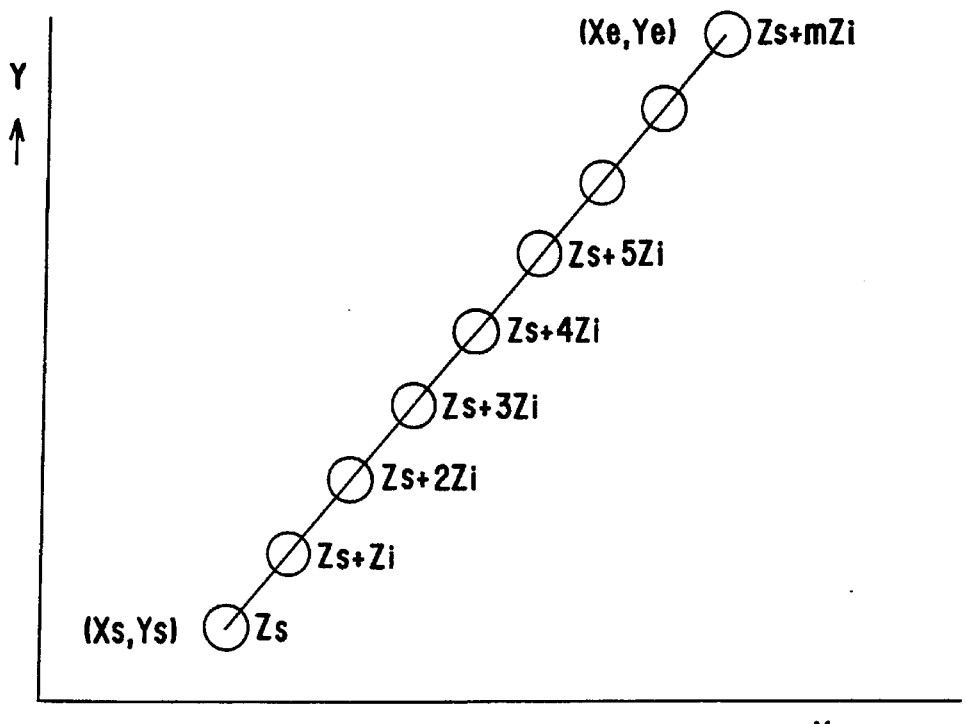
FIG. 2(A) is a diagram illustrative of a process of calculating Z values when a desired straight line is to be plotted.
Figure 2B:
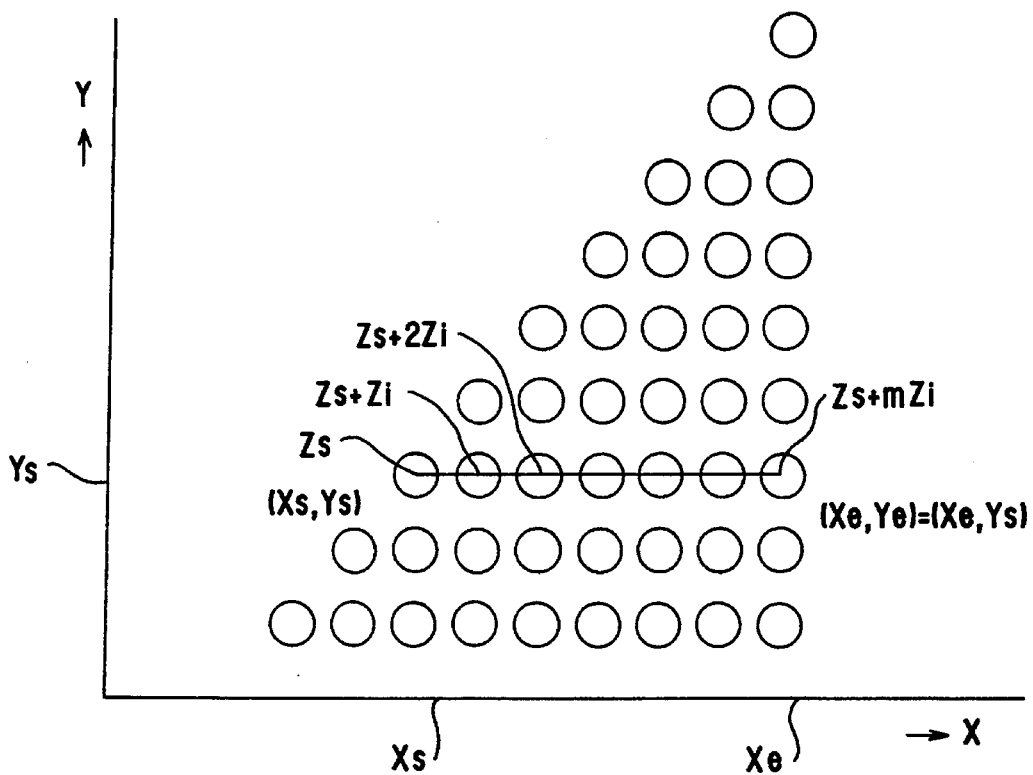
FIG. 2(B) is a diagram illustrative of a process of calculating Z values for pattern filling.
Figure 3:
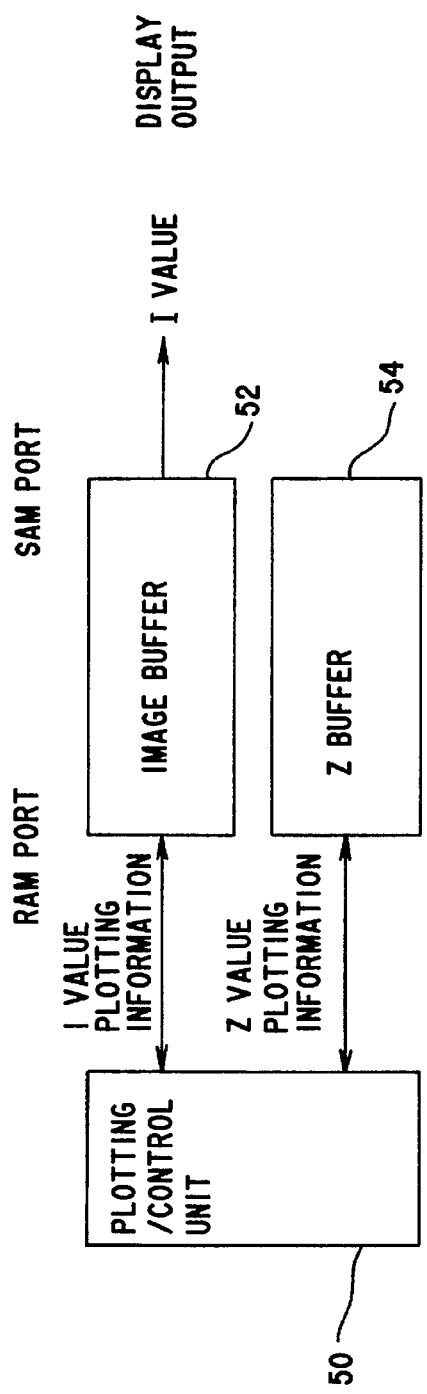
FIG. 3 is a block diagram of a conventional frame buffer having an image buffer and a Z buffer which comprise D-RAMs, respectively.
Figure 4:
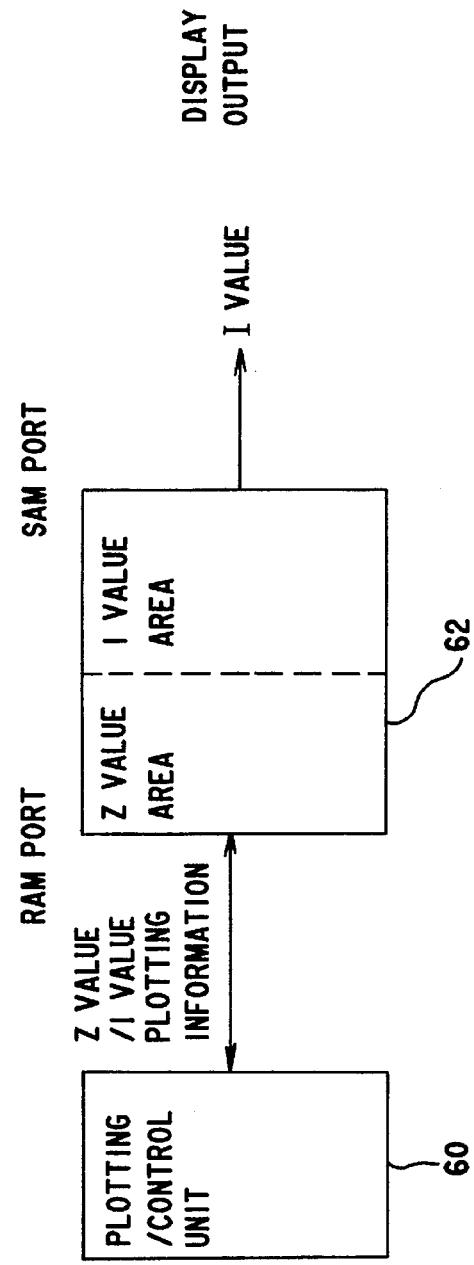
FIG. 4 is a block diagram of a conventional frame buffer comprising a single video RAM chip.
Figure 7:
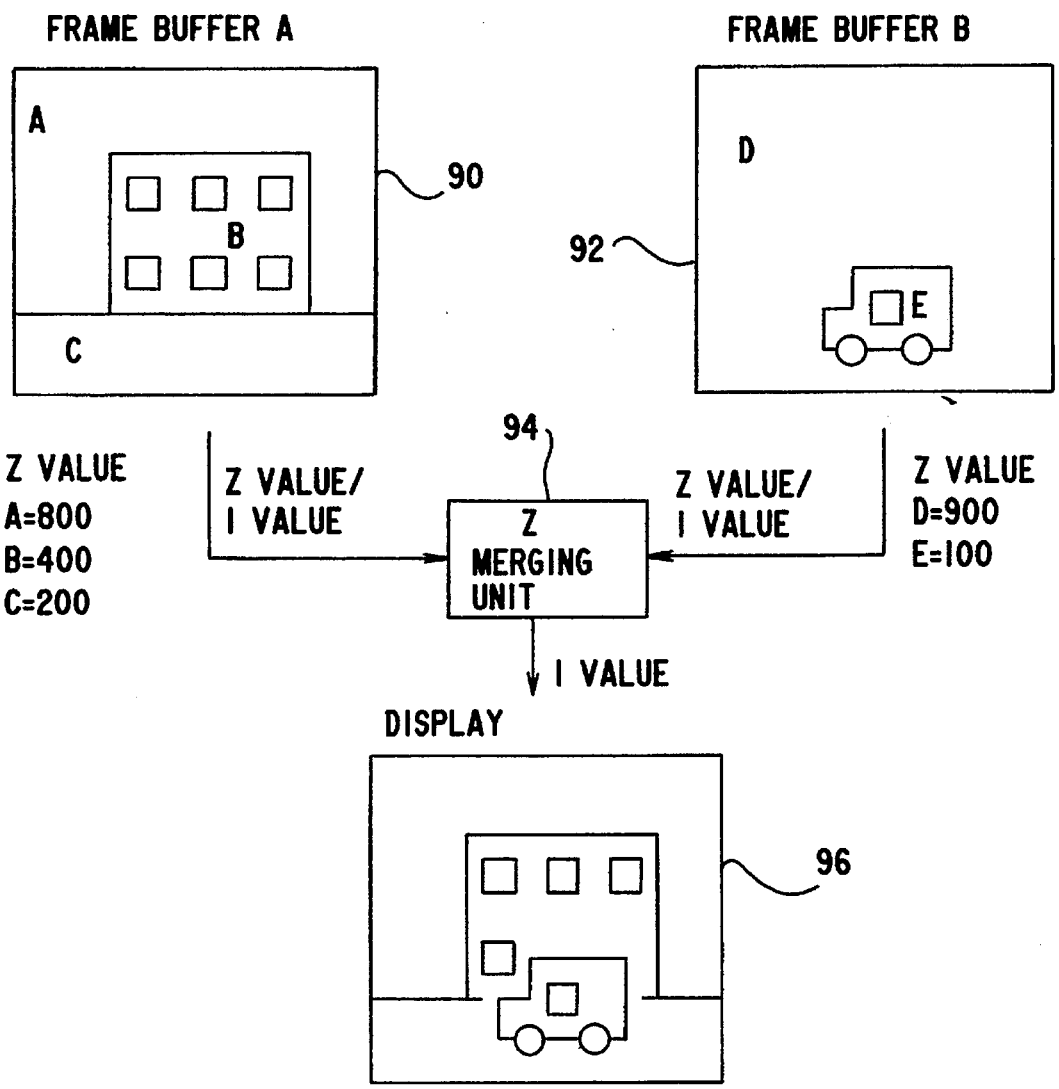
FIG. 7 is a diagram showing a display mechanism of a three-dimensional image display system with a Z merging function.
Figure 8A:
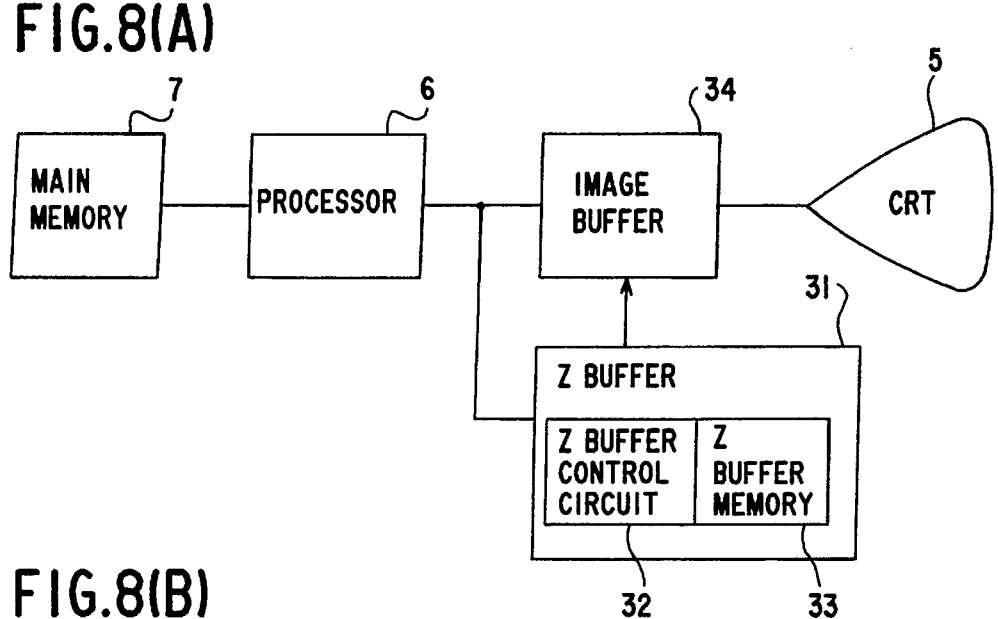
FIG. 8(A) is a block diagram of an image processing apparatus according to a first embodiment of the present invention.

FIG. 8(A) shows in block form an image processing apparatus according to a first embodiment of the present invention for carrying out pattern filling. Those parts shown in FIG. 8(A) which are identical to those shown in FIG. 1(A) are denoted by identical reference numerals, and will not be described in detail below.

As shown in FIG. 8(A), the image processing apparatus includes an image buffer 34 for storing image information (I value) of each pixel. In response to write permit signals supplied from a Z buffer control circuit 32 (described later on), the image buffer 34 simultaneously writes image information of a predetermined number of (m+1) pixels that are arranged horizontally. The write permit signals are individually given with respect to the respective pixels.

Figure 8B:
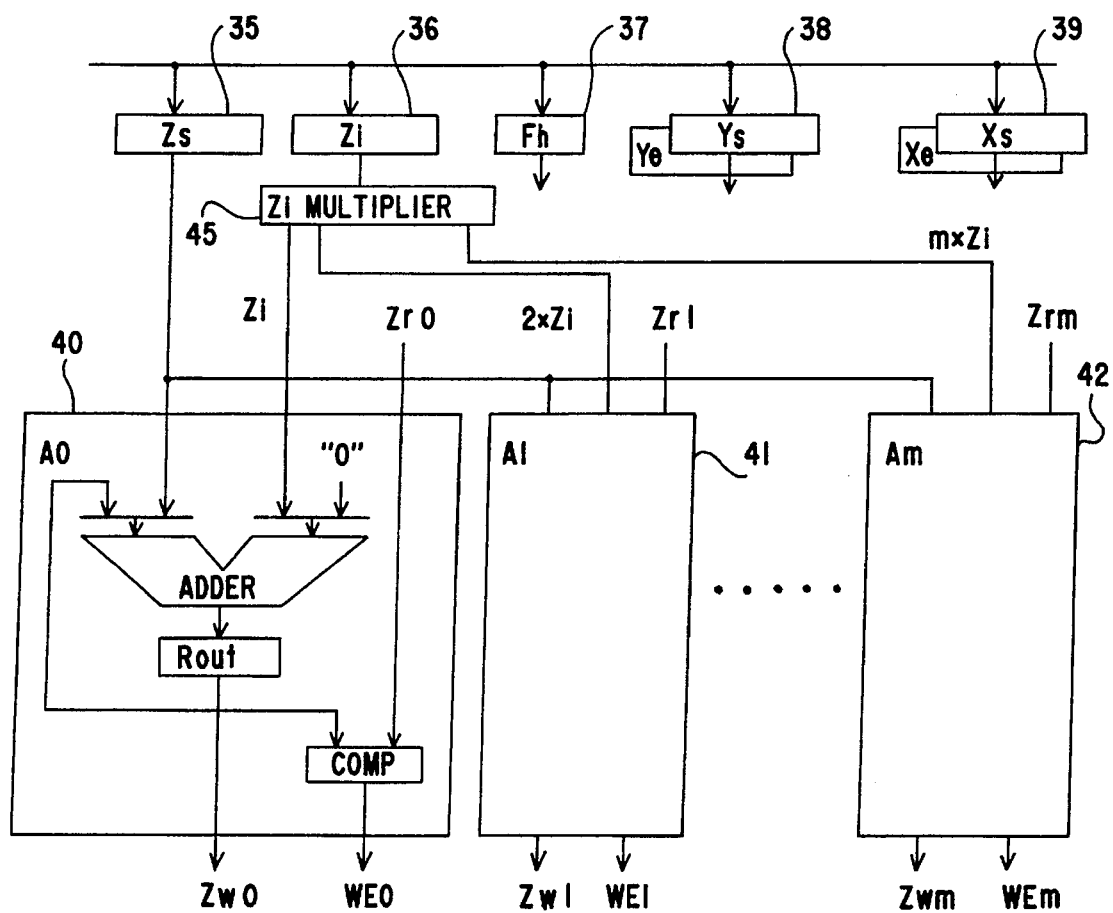
FIG. 8((B) is a block diagram of a buffer control circuit in the image processing apparatus shown in FIG. 8(A)

The image processing apparatus also has a Z buffer 31 including a Z buffer memory 33 for storing depth information (Z value) of each pixel corresponding to the image information (I value) stored in the image buffer 34. Stored depth information of the predetermined number of pixels can simultaneously be read out of the Z buffer memory 33. The Z buffer 31 also includes a Z buffer control circuit 32 which has as many Z value calculating circuits (A0~Am) 40~42 as the predetermined number of pixels, as shown in FIG. 8(B). When a plotting mode flag outputted from a plotting mode detector (Fh) 37 (described later on) is "1", then the Z value calculating circuits 40~42 simultaneously calculate new respective Z values Zw0~Zwm of the predetermined number of pixels that make up a portion of a horizontal line, and compare Z values Zr0~Zrm of corresponding pixels read from the Z buffer memory 33 with the calculated Z values Zw0~Zwm. Depending on the result of comparison, the Z value calculating circuits 40~42 simultaneously output respective writhe permit signals WE0~WEm for respective pixels to the image buffer 34 and the Z buffer memory 33. The plotting mode detector (Fh) 37 determines whether an image to be plotted is a horizontal line or not. If the image to be plotted is a horizontal line, then the plotting mode detector (Fh) 37 outputs a plotting mode flag "1". Stated otherwise, if one of the Z values Zw0~Zwm is smaller than the corresponding one of the original Z values Zr0~Zrm, then the corresponding one of the write permit signals WE0~WEm is set to "1". If not, then the corresponding one of the write permit signals WE0~WEm is set to "0".

The write permit signals WE0~WEm serve to control the writing of the corresponding pixels into the Z buffer memory 33 and the image buffer 34. If the write permit signals WE0~WEm are "1", they permit new values to be written into the Z buffer memory 33 and the image buffer 34. If the write permit signals WE0~WEm are "0", they inhibit new values from being written into the Z buffer memory 33 and the image buffer 34, and keep the originally present values in the Z buffer memory 33 and the image buffer 34.

When a straight line is to be plotted at a desired angle, the image processing apparatus processes data at the same speed as the conventional system which processes data pixel by pixel. When a horizontal line is to be plotted for pattern filling, however, the image processing apparatus processes data very quickly.

As shown in FIG. 8(B), the buffer control circuit 32 comprises a Zs register 35 for storing initial values Zs of the Z values, a Zi register 36 for storing an increment Zi of the Z values, a Y register 38 for storing Y coordinates of starting and ending points of a straight line, and an X register 39 for storing X coordinates of starting and ending points of a straight line. Data to be stored in these registers are supplied from the processor 6. The buffer control circuit 32 also has a Zi multiplier 45 for generating increments 0, Zi, 2×Zi, . . . , (m-1)×Zi based on the increment Zi, and outputting the generated increments to the Z value calculating circuits 40~42.

The Z buffer control circuit 32 of the circuit arrangement shown in FIG. 8(B) poses no problem if the image buffer 34 and the Z buffer memory 33 can simultaneously be accessed for a predetermined number of addresses from a designated address. Normally, each of the image buffer 34 and the Z buffer memory 33 is arranged such that it is accessed per memory cell block, each memory cell block being composed of as many memory cells as a power of 2. Since the coordinates of starting- and ending-point pixels in plotting a horizontal line are not necessarily the same as address boundaries at the ends of memory cell blocks in the image buffer 34 and the Z buffer memory 33, it is necessary to take this into account in the design of a Z buffer control circuit.

Figure 9:
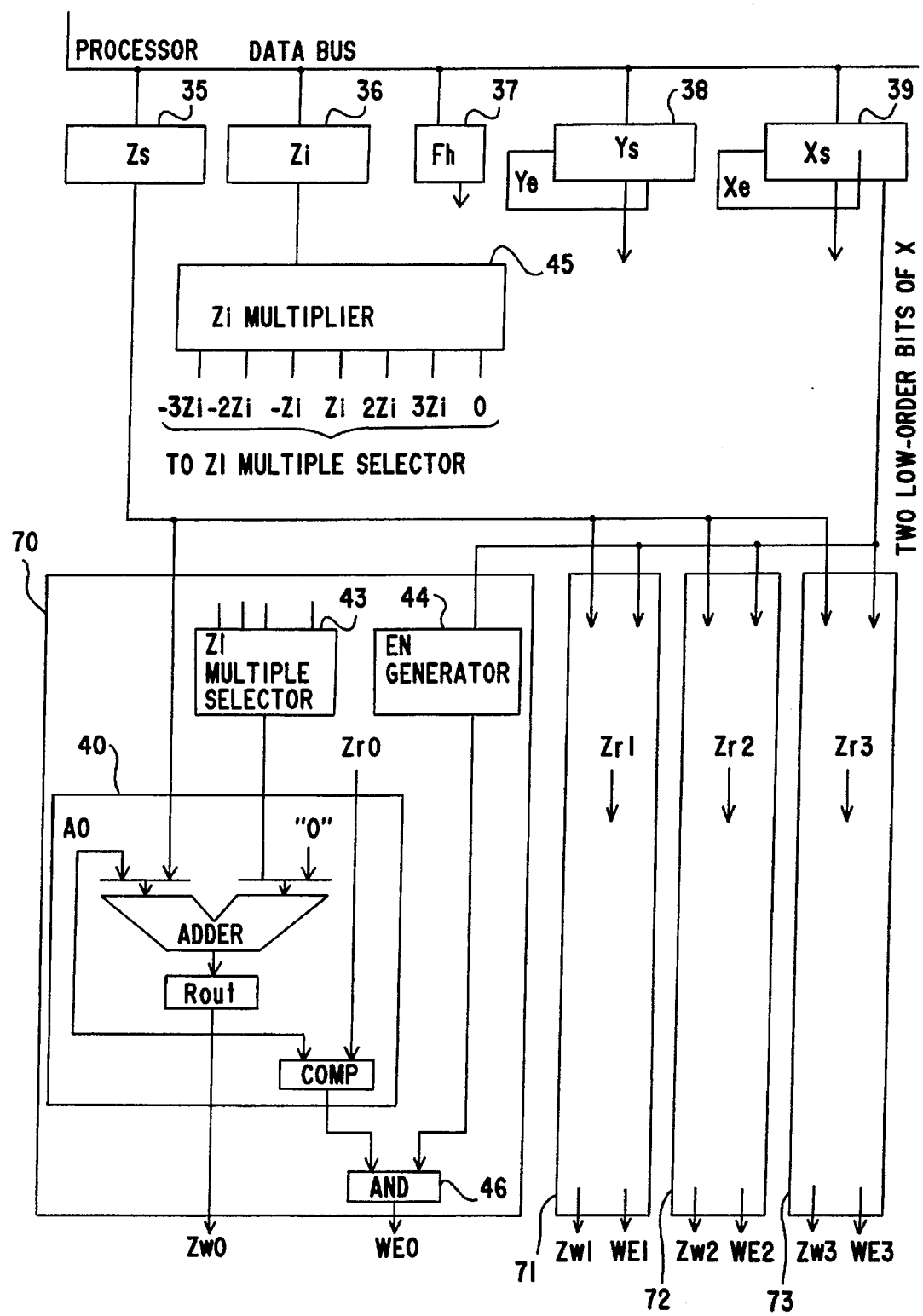
FIG. 9 is a block diagram showing, in specific detail, the buffer control circuit shown in FIG. 8(8)

FIG. 9 shows in greater detail the Z buffer control circuit 32 that is designed in view of the above consideration. Those parts shown in FIG. 9 which are identical to those shown in FIG. 8(B) are denoted by identical reference numerals, and will not be described in detail below.

The Z buffer control circuit includes a Zi multiple selector 43 for selecting a necessary multiple from the 0, Zi, 2×Zi, . . . , (m−1)×Zi outputted by the Zi multiplier 45 according to a table (described later on), and outputting the selected multiple to the Z value calculating circuit 40. An EN generator 44 generates an enable signal EN according the table based on the contents of two low-order bits of an X address supplied from the X register 39. An AND gate 46 serves to AND an output signal from the EN generator 44 and an output signal from a comparator in the Z value calculating circuit 40, and outputs a write permit signal WE0. The Zi multiple selector 43, the EN generator 44, the AND gate 46, and the Z value calculating circuit 40 jointly make up a circuit 70. The Z buffer control circuit has other circuits 71~73 each identical to the circuit 70. There are as many circuits 70~73 as the number of memory cell blocks, i.e., four circuits 70~73 in this embodiment.

Figures 10A, 10B:
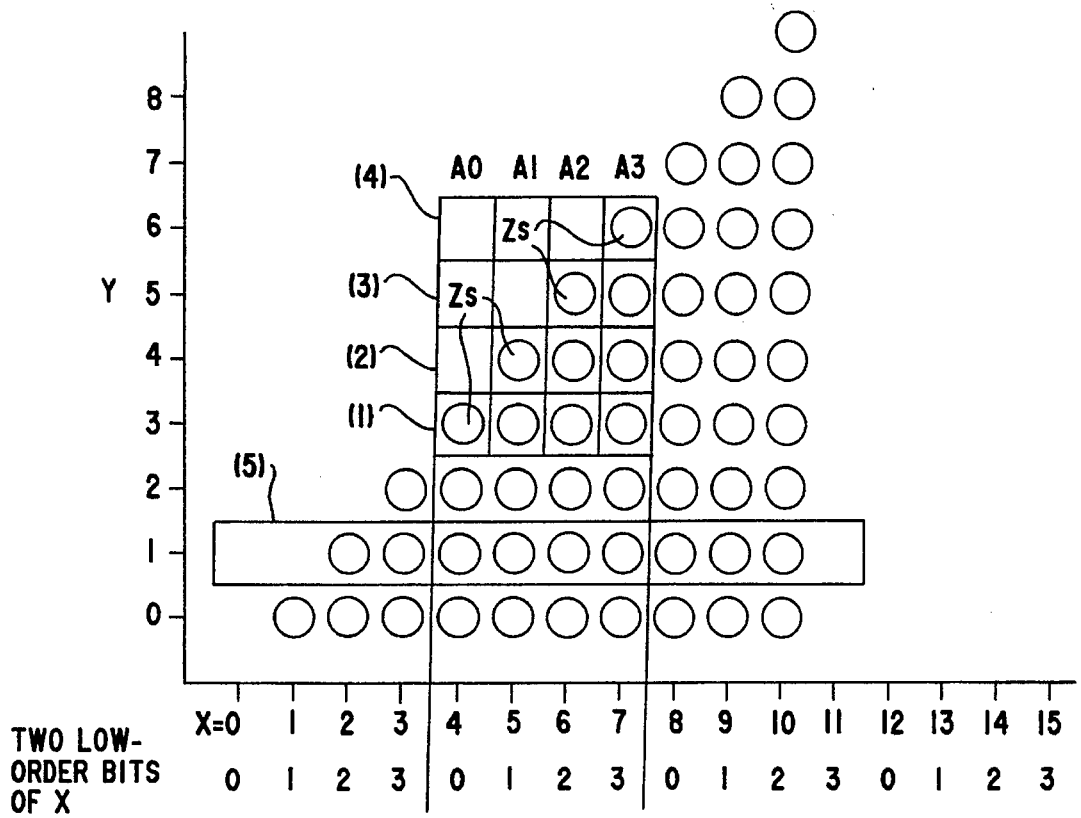
FIG. 10(A) is a diagram showing the relationship between a starting-point pixel and address boundaries of memories in case the address boundaries are taken into account.
FIG. 10(B) is a diagram showing a first calculation table to be used by calculating circuits in case the address boundaries of memories are taken into account.

FIG. 10(A) shows the relationship between a starting-point pixel and address boundaries of the image buffer 34 and the Z buffer memory 33. Specifically, FIG. 10(A) shows the relationship between a starting-point pixel and address boundaries at the time a triangular pattern is filled.

In FIG. 10(A), if the image buffer 34 and the Z buffer memory 33 are to be accessed per unit of four pixels with respect to a horizontal line such as a straight line 5 at y=1, it is necessary that the image buffer 34 and the Z buffer memory 33 be accessed three times as shown. When the image buffer 34 and the Z buffer memory 33 are accessed for the first time and finally, it is necessary that the I and Z values of some pixels be not written and their original values be left due to lack of a portion of the horizontal line. To meet such a requirement, the Zi multiple selector 43 selects a multiple based on the value of two low-order bits of an X coordinate (X address), and the EN generator 44 generates an enable signal EN.

More specifically, if the image buffer 34 and the Z buffer memory 33 are accessed per unit of four pixels while the plotting mode detector (Fh) 37 is outputting a plotting mode flag "1", the accessing corresponds to a horizontal line ① in FIG. 10(A) when the two low-order bits of the X coordinate (X address) supplied from the X register 39 are of a value "0" (decimal notation), corresponds to a horizontal line ② in FIG. 10(A) when the two low-order bits of the X coordinate (X address) supplied from the X register 39 are of a value "1" (decimal notation), corresponds to a horizontal line ③ in FIG. 10(A) when the two low-order bits of the X coordinate (X address) supplied from the X register 39 are of a value "2" (decimal notation), and corresponds to a horizontal line ④ in FIG. 10(A) when the two low-order bits of the X coordinate (X address) supplied from the X register 39 are of a value "3" (decimal notation).

FIG. 10(B) is a first calculation table for determining a multiple and an enable signal EN for first accessing with the Z value calculating circuits A0~A3 from the values of the two low-order bits of the X coordinates (X addresses). When the value of two low-order bits of an X coordinate (X address) is "0", the Zi multiple selector 43 in the circuit 70 selects a multiple "0", and the Z value calculating circuit (A0) 40 calculates (Zs+0) and outputs it as a new Z value Zw0 to the Z buffer memory 33 according to the first row of the first calculation table of FIG. 10(B). The EN generator 44 generates an enable signal "1" according to the first calculation table. Since the AND gate 46 is supplied with the enable signal "1" from the EN generator 44, if the comparator in the Z value calculating circuit 40 outputs a signal "1", indicating that the new Z value Zw0 is smaller than the original Z value Zr0, then the AND gate 46 outputs a write permit signal WE0 of "1" to the Z buffer memory 33 and the image buffer 34.

Similarly, the Zi multiple selector in the circuit 71 selects a multiple Zi, and the Z value calculating circuit (A1) calculates (Zs+Zi) and outputs it as a new Z value Zw1 to the Z buffer memory 33. The EN generator generates an enable signal "1". Since the AND gate is supplied with the enable signal "1" from the EN generator, if the comparator in the Z value calculating circuit outputs a signal "1", then the AND gate outputs a write permit signal WE1 of "1" to the Z buffer memory 33 and the image buffer 34. Likewise, the Zi multiple selector in the circuit 72 selects a multiple 2Zi, and the Z value calculating circuit (A2) calculates (Zs+2Zi) and outputs it as a new Z value Zw2 to the Z buffer memory 33. The EN generator generates an enable signal "1". Since the AND gate is supplied with the enable signal "1" from the EN generator, if the comparator in the Z value calculating circuit outputs a signal "1", then the AND gate outputs a write permit signal WE2 of "1" to the Z buffer memory 33 and the image buffer 34. Likewise, the Zi multiple selector in the circuit 73 selects a multiple 3Zi, and the Z value calculating circuit (A3) calculates (Zs+3Zi) and outputs it as a new Z value Zw3 to the Z buffer memory 33. The EN generator generates an enable signal "1". Since the AND gate is supplied with the enable signal "1" from the EN generator, if the comparator in the Z value calculating circuit outputs a signal "1", then the AND gate outputs a write permit signal WE3 of "1" to the Z buffer memory 33 and the image buffer 34.

Then, when the value of two low-order bits of an X coordinate (X address) is "1", the Zi multiple selector 43 in the circuit 70 selects a multiple (−Zi0), and the Z value calculating circuit (A0) 40 calculates (Zs−Zi0) and outputs it as a new Z value Zw0 to the Z buffer memory 33 according to the second row of the first calculation table of FIG. 10(B). However, the EN generator 44 generates an enable signal "0" according to the first calculation table. Since the AND gate 46 is supplied with the enable signal "0" from the EN generator 44, the AND gate 46 outputs a write permit signal WE0 of "0" to the Z buffer memory 33 and the image buffer 34 regardless of the output signal from the comparator in the Z value calculating circuit 40. Stated otherwise, as any pixels making up a horizontal line do not exist, the contents of the Z buffer memory 33 and the image buffer 34 are not updated, and hence the problem of inconsistency between the coordinates of a starting-point pixel and address boundaries in plotting a horizontal line is solved. Operation of the circuits 71–73 is similar to the above operation thereof at the time the value of the two low-order bits is "0".

When the value of two low-order bits of an X coordinate (X address) is "2" or "3", the circuits 70~73 operate in the same manner as above according to the second or third row of the first calculation table of FIG. 10(B).

Any lack of agreement between the coordinates of an ending-point pixel and address boundaries in plotting a horizontal Line poses no problem because it can easily be handled under the control of the processor 6. Upon second and subsequent accessing of the Z buffer memory 33 and the image buffer 34, a multiple shown in the first calculation table of FIG. 10(B) is set to (previous multiple+4Zi) and the enable signal EN is set to "1" except for final accessing.

For plotting a straight line inclined at a certain angle, rather than a horizontal line, i.e., when the plotting mode flag is "0", the Z values are calculated as they are, and only those of the write permit signals WE0~WE3 which correspond to designated addresses are set to "1".

In three-dimensional graphics, the above circuit arrangement is highly effective to achieve high-speed plotting because pattern filling, which is a process of plotting horizontal lines, consumes most of the processing time. Inasmuch as it is easy to write and read a plurality of bits simultaneously in and out of the image buffer and the Z buffer memory for plotting horizontal Lines, the circuit arrangement may be made relatively simple.

A image processing apparatus according to a second embodiment of the present invention, for use as a three-dimensional image display system with a Z merging function, will be described below.

FIG. 11 shows in block form the image processing apparatus according to the second embodiment. As shown in FIG. 11, an image buffer 112 comprises a video RAM having a RAM port and a SAM port, and a Z buffer 114 comprises a video RAM having a RAM port for inputting Z values from and outputting Z values to a plotting/controlling unit 110 and a SAM port for outputting Z values to a Z merging unit (not shown). Therefore, the image buffer 112 can output I values, whereas the Z buffer 114 can output Z values.

The image processing apparatus has a plurality of frame buffers each comprising the image buffer 112 and the Z buffer 114. Output signals from the respective frame buffers are transmitted to the Z merging unit. With the plotting process distributed among the frame buffers, it is possible to display images at high speed using the Z merging function.

A image processing apparatus according to a third embodiment of the present invention, for use as a three-dimensional image display system with a Z merging function, with a single video RAM chip for storing both Z and I values, will be described below.

FIG. 12 shows in block form the image processing apparatus according to the third embodiment. As shown in FIG. 12, a frame buffer 122 comprises a single video RAM chip which writes both Z and I values according to a row address and column address, described later, the video RAM chip having RAM and SAM ports. The Z and I values that have been written per pixel in the frame buffer 122 are alternately read out, and outputted to Z and I value output terminals, respectively. Of the Z and I values per pixel, the Z value is outputted from the SAM port earlier than the I value. To the Z value output terminal, there are connected two flip-flops 126, 128 in cascade. One flip-flop 124 is connected to the I value output terminal. If the I value is to be outputted from the SAM port earlier than the Z value, then two flip-flops are connected in cascade to the I value output terminal, and one flip-flop is connected to the Z value output terminal. These flip-flops operate to effect timing adjustment for outputting the Z and I values per pixel simultaneously to a Z merging unit (not shown).

In FIG. 12, for alternately outputting the Z and I values from the SAM port of the frame buffer 122, a plotting/controlling unit 120 writes the corresponding Z and I values alternately in the frame buffer 122 in the column direction. For reading out the Z and I values from the frame buffer 122, switching is effected between the Z and I value output terminals to output the read values, using the value of the least significant bit of a column address of the frame buffer 122. In this manner, the Z and I values per pixel can alternately be outputted from the frame buffer 122.

FIG. 13 is a timing chart illustrative of a process of adjusting the timing to output the Z and I values with the flip-flops. In FIG. 13, the Z and I values per pixel are alternately outputted from the SAM port of the frame buffer 122. The first flip-flop 126 connected to the Z value output terminal operates at the time the Z value is outputted from the SAM port. The flip-flop 124 connected to the I value output terminal operates at the time the I value is outputted from the SAM port.

The second flip-flop 128 connected to the flip-flop 126 for Z value operates at the time the I value is outputted from the SAM port, i.e., at the same time that the flip-flop 124 connected to the I value output terminal operates. Therefore, the Z and I values are outputted simultaneously from the flip-flop 128 and the flip-flop 124, respectively.

Figure 14A:
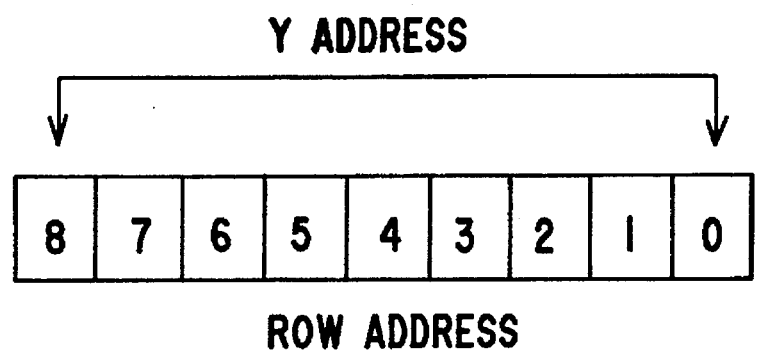
FIG. 14(A) is a showing a row address of the image processing apparatus shown in FIG. 12.
Figure 14B:
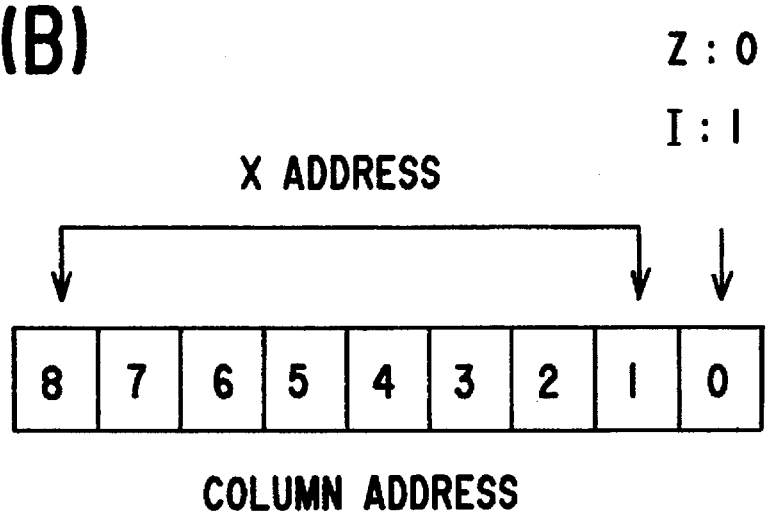
FIG. 14(B) is a showing a column address of the image processing apparatus shown in FIG. 12.

FIGS. 14(A) and 14(B) show addresses for alternately outputting the Z and I values per pixel. In FIGS. 14(A) and 14(B), all bits of a row address are used to designate an address in the Y direction, the least significant bit of a column address is used to represent information indicative of either an address relative to the Z value or an address relative to the I value, and the eight high-order bits of the column address are used to designate an address in the X direction.

If the least significant bit of a column address of data read out of the frame buffer 122 is "0", for example, then the data is identified as the Z value. If the least significant bit of a column address of data read out of the frame buffer 122 is "1", for example, then the data is identified as the I value.

The image processing apparatus may comprise a plurality of frame buffers 122, and output signals from the respective frame buffers may be transmitted to a Z merging unit. With the plotting process distributed among the frame buffers, it is possible to display images at high speed using the Z merging function.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to as falling within the scope of the invention in the appended claims and their equivalents.

What is claimed is:

1. An image processing apparatus comprising:

a frame buffer for storing image information and depth information per pixel, said frame buffer comprising a single device with a SAM port;

said frame buffer including an image buffer for simultaneously storing image information of a predetermined number of pixels arranged in a horizontal direction in response to write permit signals corresponding to said pixels, respectively; and a Z buffer for simultaneously outputting stored depth information of said predetermined number of pixels and simultaneously storing new depth information of said predetermined number of pixels in response to said write permit signals;

identifying means for identifying whether a condition indicating that an image to be plotted is a horizontal line is satisfied or not; and a plurality of as many write permit signal output means as said predetermined number, for simultaneously calculating respective items of new depth information of said predetermined number of pixels when said condition is satisfied as identified by said identifying means, comparing the depth information read from said Z buffer with the calculated depth information, and simultaneously outputting the write permit signals of said predetermined number of pixels to said image buffer and said Z buffer in response to the comparison.

2. An image processing apparatus according to claim 1, wherein said condition comprises a condition for effecting pattern filling when an object is plotted as a solid model in three-dimensional graphics.

3. An image processing apparatus according to claim 1, wherein said write permit signal output means comprise means for calculating the respective items of new depth information with respect to said pixels based on depth information of pixel at an end point of a horizontal line to be plotted and information with respect to a change in depth between adjacent pixels when said condition is satisfied as identified by said identifying means.

4. An image processing apparatus according to claim 1, wherein said write permit signal output means comprise means for outputting said write permit signals when said calculated depth information represents a depth smaller than the depth represented by said depth information read from said Z buffer.

5. An image processing apparatus according to claim 1, wherein said write permit signal output means comprise means for failing to output said write permit signals when any of pixels making up a horizontal line to be plotted are not to be processed by the write permit signal output means.

6. An image processing apparatus comprising:

a frame buffer for storing image information and depth information for each of a plurality of pixels;

said frame buffer including an image buffer for storing the image information for each pixel and outputting the stored image information; and a Z buffer for storing the depth information for each pixel and having a SAM port for outputting the stored depth information; and means for delaying one of the image information and the depth information, output by said frame buffer, by a predetermined period to simultaneously output the image information and depth information.

7. An image processing apparatus comprising:

a plurality of frame buffers each for storing image information and depth information for each pixel of a plurality of pixels;

each of said frame buffers including an image buffer for storing the image information for each pixel and outputting the stored image information; and a Z buffer for storing the depth information for each pixel and having a SAM port for outputting the stored depth information;

determining means connected to said frame buffers, for determining relative front and back positions of figures represented by the image information stored in the image buffers, based on the depth information outputted by the Z buffers of the representative frame buffers; and means for delaying one of the image information and the depth information, output by said frame buffer, by a predetermined period to simultaneously output the image information and depth information.

8. An image processing apparatus comprising:

a frame buffer for storing image information and depth information for each pixel of said plurality of pixels, said frame buffer comprising a single video RAM chip having a SAM port;

writing means for writing the image information and the depth information in said frame buffer according to a row address and a column address which represents identifying information indicative of the image information or the depth information;

reading means for distinguishing and alternately reading the image information and the depth information from the SAM port of said frame buffer based on said column address; and serial-to-parallel converting means for simultaneously outputting the image information and the depth information for each pixel which are alternately read out of said SAM port.

9. An image processing apparatus according to claim 8, wherein said column address has a least significant bit, said identifying information being represented by said least significant bit of the column address.

10. An image processing apparatus according to claim 8 wherein said serial-to-parallel converting means comprises a single flip-flop for outputting one of said image information and said depth information, and two cascaded flip-flops for outputting the other of said image information and said depth information.

11. An image processing system comprising:

a plurality of image processing apparatus each including a frame buffer for storing image information and depth information for each pixel of a plurality of pixels, said frame buffer comprising a single video RAM chip having a SAM port;

writing means for writing the image information and the depth information in said frame buffer according to a row address and a column address which represents identifying information indicative of the image information or the depth information;

reading means for distinguishing and alternately reading the image information and the depth information from the SAM port of said frame buffer based on said column address; and serial-to-parallel converting means for simultaneously outputting the image information and the depth information for each pixel which are alternately read out of said SAM port; and a plurality of determining means connected respectively to said image processing apparatus, for determining relative front and back positions of figures represented by the image information stored in the image buffers, based on the depth information outputted by said serial-to-parallel converting means.

* * * * *